United States Patent
Hua et al.

(10) Patent No.: US 7,418,660 B2
(45) Date of Patent: Aug. 26, 2008

(54) METHOD AND SYSTEM FOR CACHING AND ADAPTING DYNAMIC DISPLAY PAGES FOR SMALL DISPLAY DEVICES

(75) Inventors: Zhigang Hua, Beijing (CN); Wei-Ying Ma, Beijing (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 10/949,147

(22) Filed: Sep. 23, 2004

(65) Prior Publication Data

US 2006/0064636 A1 Mar. 23, 2006

(51) Int. Cl.
*G06F 17/00* (2006.01)
*G06F 15/00* (2006.01)

(52) U.S. Cl. .................. 715/234; 715/273; 715/229

(58) Field of Classification Search ............. 715/526, 715/513, 511
See application file for complete search history.

(56) References Cited

U.S. PATENT DOCUMENTS

| | | | | |
|---|---|---|---|---|
| 6,029,180 | A * | 2/2000 | Murata et al. | 715/501.1 |
| 2004/0088557 | A1 * | 5/2004 | Malcolm et al. | 713/193 |
| 2004/0088726 | A1 | 5/2004 | Ma et al. | |
| 2004/0148571 | A1 * | 7/2004 | Lue | 715/514 |
| 2004/0165784 | A1 | 8/2004 | Xie et al. | |
| 2005/0004910 | A1 * | 1/2005 | Trepess | 707/5 |
| 2005/0004949 | A1 * | 1/2005 | Trepess et al. | 707/104.1 |

OTHER PUBLICATIONS

Buyukkokten, Orkut et al., "Seeing the Whole in Parts: Text Summarization for Web Browsing on Handheld Devices," WWWMay 10, 2001, Hong Kong, ACM, http://wwwconf.ecs.soton.ac.uk/archive/00000067/01/index.html, [last accessed Mar. 21, 2007].
Chen, Jinlin et al., "Function-Based Object Model Towards Website Adaptation," In Proceedings of the 10th International World Wide Web Conference, Hong Kong, China, May 2001, ACM, pp. 587-596.
Chen, Yu, Wei-Ying Ma & Hong-Jiang Zhang, "Detecting Web Page Structure for Adaptive Viewing on Small Form Factor Devices," WWW 2003, Budapest, Hungary, May 2003, ACM, pp. 225-233.
Edge Side Includes, Copyright 2007 Akama Technologies http://www.akamai.com/html/support/esi.html, [last accessed Mar. 21, 2007].
Yuan, Chun, Yu Chen and Zheng Zhang, "Evaluation of Edge Caching/Offloading for Dynamic Content Delivery," WWW 2003, May 2003, Budapest, Hungary, ACM.
Yuan, Chun, Zhigang Hua and Zheng Zhang, "Proxy+: Simple Proxy Augmentation for Dynamic Content Processing," IWCW 2003, New York, Sep. 2003.

\* cited by examiner

*Primary Examiner*—Doug Hutton
*Assistant Examiner*—Nathan Hillery
(74) *Attorney, Agent, or Firm*—Perkins Coie LLP (57) ABSTRACT

A display system adapts a display page to a small display area using semantic information indicated by portions of the display page that are designated as cacheable. The display system adapts a display page by identifying leaf fragments, that is, fragments that contain no other fragments. The display system then determines whether each leaf fragment is a block that can be displayed as a unit in the display area or should be subdivided into blocks that each can be displayed as a unit in the display area. The display system then displays the display page on a block-by-block basis.

28 Claims, 8 Drawing Sheets

METHOD AND SYSTEM FOR CACHING AND ADAPTING DYNAMIC DISPLAY PAGES FOR SMALL DISPLAY DEVICES

TECHNICAL FIELD

The described technology relates generally to displaying web pages on mobile devices with small display areas.

BACKGROUND

Mobile devices, such as handheld personal computers and personal digital assistants ("PDAs"), are becoming increasingly popular ways to access the Internet. Unfortunately, the experience of users in accessing web pages using these mobile devices has been less than satisfactory. First, because these mobile devices have small display areas, it is difficult to effectively display in such a small display area a web page that is designed for a large display area. Second, because these mobile devices typically have a relatively slow communications link (e.g., via a cell phone network), it can take an unacceptably long time to download an accessed web page. Third, because the mobile devices have limited computing power, the rendering of a complex web page can also take an unacceptably long time.

To allow for the effective display of web pages on a small display area, some techniques have been developed to dynamically adapt web pages that are too large for a small display area. One such adaptation technique is "page splitting," which attempts to divide a web page into blocks that can fit as a unit into a small display area. One such page splitting technique analyzes the position and shape of HTML elements of a web page to identify blocks. However, it can be difficult to identify blocks from low-level HTML tags in a way that preserves page structure and does not lose information. Moreover, such adaptation techniques can be computationally expensive, especially on a mobile device.

Some techniques have been developed to speed up delivery of dynamic web pages by caching such web pages either at a client or at a server. A dynamic web page is a web page that is generated dynamically when the web page is accessed. The content of such web pages can be tailored to the user or contain up-to-date information (e.g., stock quotes). Such caching techniques, however, typically cache on a page-by-page basis. As a result, when even a small portion of a dynamic web page is changed, the entire web page needs to be retrieved from the web server. Various strategies have been proposed to make the caching of web pages more effective. One such strategy designates fragments within a web page that represent a cacheable portion. Each fragment can have its own expiration time. Thus, only those fragments that have expired need to be retrieved from the web server, and fragments that have not expired can be retrieved from the cache. Although adaptation can be performed on a web page whose fragments have been refreshed, such adaptation is still time-consuming, especially for a mobile device.

It would be desirable to combine adaptation techniques with fragment-based caching techniques to improve the overall performance of accessing web pages via a mobile device. In particular, it would be desirable to avoid having to adapt an entire web page each time a fragment is refreshed and to take advantage of semantic information indicated by fragments when adapting a web page.

SUMMARY

A display system adapts a display page to a small display area using semantic information indicated by portions of the display page that are designated as cacheable. A display page may have various portions that are designated as cacheable fragments as part of the definition of the display page. The display system adapts a display page by identifying leaf fragments, that is, fragments that contain no other fragments. The display system then determines whether each leaf fragment is a block that can be displayed as a unit in the display area or should be subdivided into blocks that each can be displayed as a unit in the display area. The display system then displays the display page on a block-by-block basis.

DETAILED DESCRIPTION

A method and system for displaying display pages on a small display device is provided. In one embodiment, the display system adapts a display page to a small display area using semantic information indicated by portions of the display page that are designated as cacheable. A display page may have various portions that are designated as cacheable fragments. The display system adapts a display page by identifying leaf fragments, that is, fragments that contain no other fragments. The display system then determines whether each leaf fragment is a block that can be displayed as a unit in the display area or should be subdivided into blocks that each can be displayed as a unit in the display area. The display system may also cache the fragments so that only fragments that have expired need to be refreshed when the display page is redisplayed. In addition, the display system may cache adaptation information that indicates whether a leaf fragment is a block or is subdivided into blocks. When portions of the leaf fragment are to be displayed, the display system can use the cached adaptation information without having to re-adapt the fragment. In this way, devices with small display areas can avoid having to re-adapt an entire display page when a fragment is refreshed and can use the semantic information indicated by the designation of a portion as a fragment when adapting a display page.

In one embodiment, the display system represents a display page as a hierarchy of nodes. For example, if the display page is an HTML document, then the hierarchy may be represented by the document object model ("DOM"). These nodes are referred to as "document nodes" since they are explicitly defined in the display page document. Some of the document nodes may be designated as "fragment nodes" that can be cached. A fragment node includes an expiration time, also referred to as a time-to-live indicator, that indicates when the fragment expires and needs to be refreshed. The fragment nodes can be hierarchically organized in that a fragment node may contain a child fragment node or a child non-fragment node.

Upon receiving a display page, the display system adapts the display page by first identifying as "segment nodes" those document nodes that have no child document nodes, that is, leaf document nodes. The display system then identifies whether a segment node is a block node that can be displayed as a unit or can be subdivided into non-document, block nodes. The display system then caches the content of the nodes, the identification of the segment nodes, and the designation of block nodes. Upon receiving a request to display content of a node, the display system determines whether the cached content of that node has expired. (A non-fragment node may be considered to expire immediately and thus cannot be cached.) When the cached content of the node has expired, the display system retrieves from a display page server the content of the fragment node that has expired. The display system then identifies the segment nodes of the retrieved fragment node, designates block nodes, and caches the received content and adaptation information. The display system then displays the node based on the cached content and adaptation information.

Figure 1:
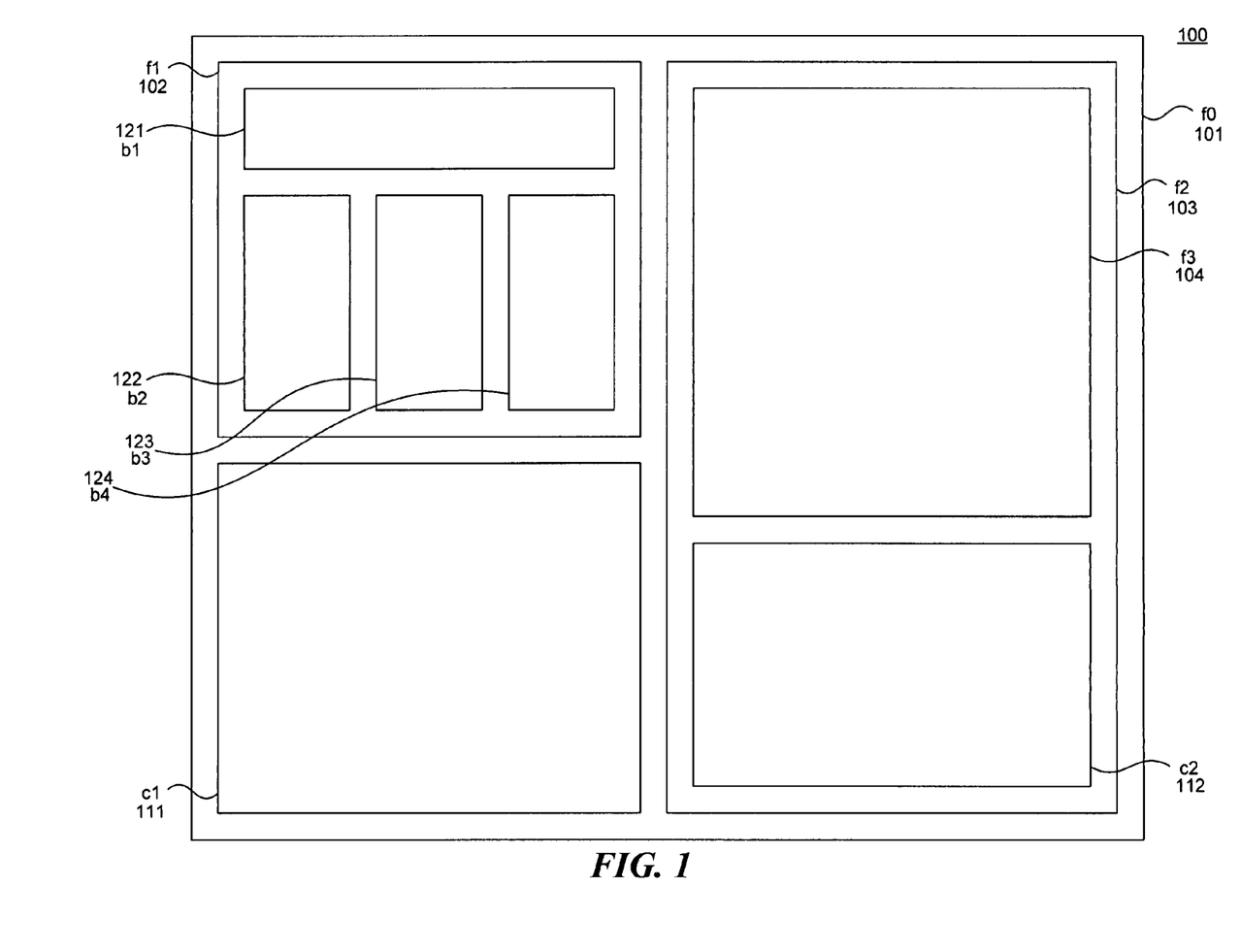
FIG. 1 illustrates nodes of a display page in one embodiment.

FIG. 1 illustrates nodes of a display page in one embodiment. The display page 100 includes nodes 101-104, 111-112, and 121-124. The nodes include document nodes 101-104 and 111-112 and non-document nodes 121-124. Document nodes 101-104 are fragment nodes f0, f1, f2, and f3, and document nodes 111-112 are non-fragment nodes c1 and c2. The non-document nodes 121-124 are block nodes b1, b2, b3, and b4. Fragment node f0 contains fragment nodes f1 and f2 and non-fragment node c1. Fragment node f2 contains fragment node f3 and non-fragment node c2. Fragment node f1 contains block nodes b1, b2, b3, and b4 that are identified during adaptation.

Figure 2:
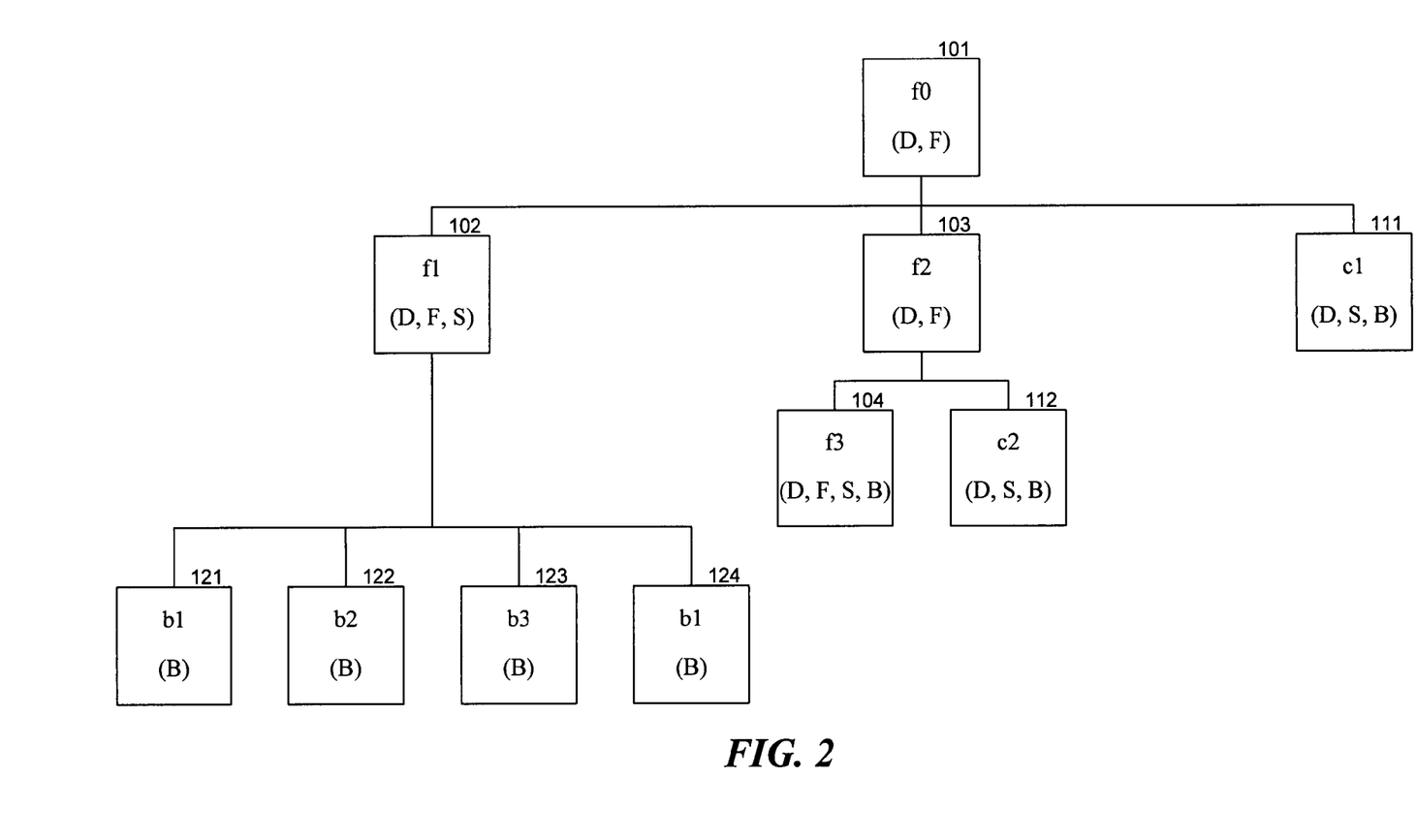
FIG. 2 illustrates the hierarchical organization of the nodes of the display page of FIG. 1.

FIG. 2 illustrates the hierarchical organization of the nodes of the display page of FIG. 1. Fragment node f0, the root node of the hierarchy, contains fragment nodes f1 and f2 and non-fragment node c1 as child nodes. Fragment node f2 contains fragment node f3 and non-fragment node c2 as child nodes. Fragment node f1 has been divided into block nodes b1, b2, b3, and b4. The parenthetical within each node identifies the node type: "D" indicates a document node, "F" indicates a fragment node, "S" indicates a segment node, and "B" indicates a block node. For example, fragment node f3 is a document node, a fragment node, a segment node, and a block node; and non-fragment node c1 is a document node, a segment node, and a block node.

Figure 3:
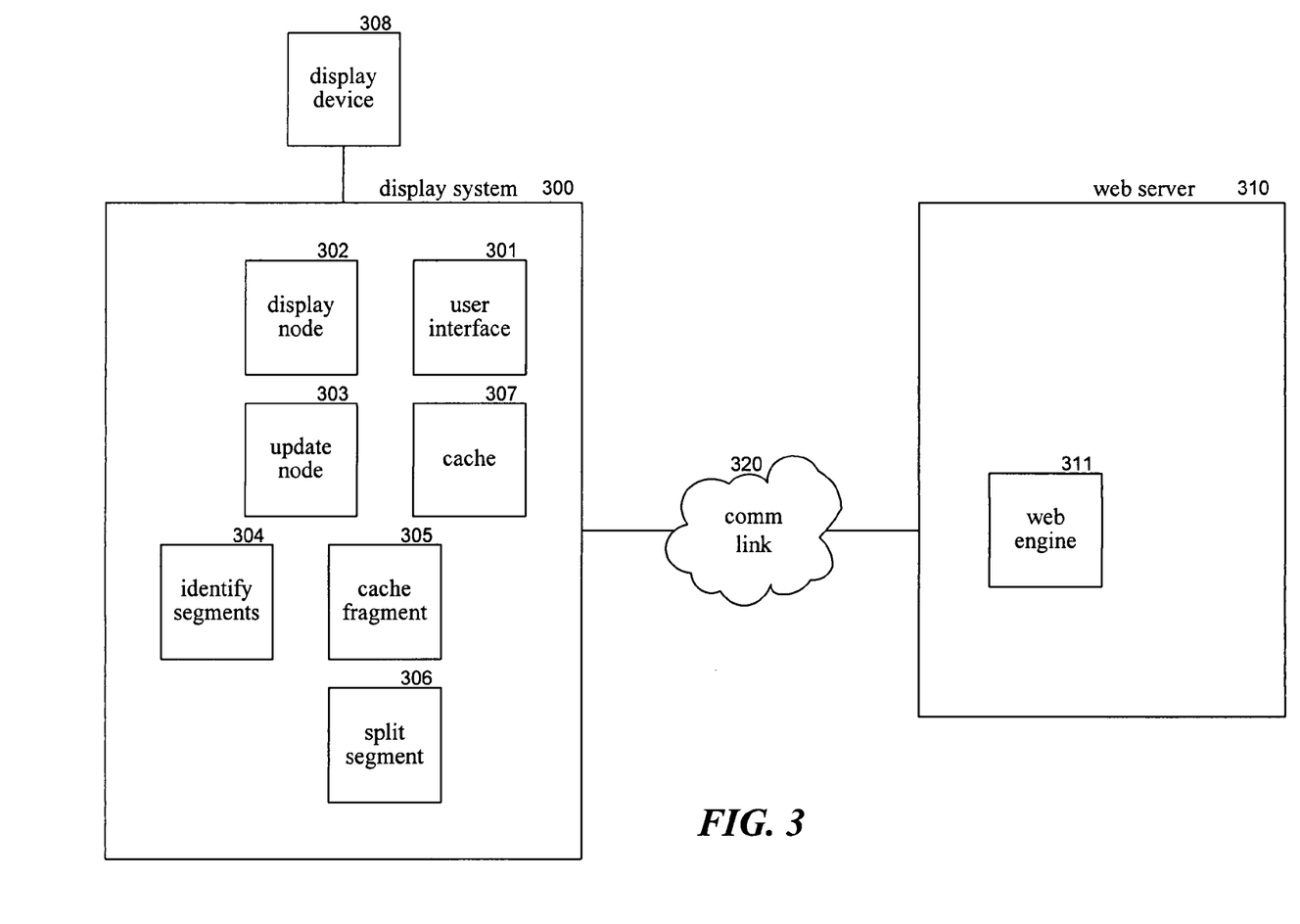
FIG. 3 is a block diagram illustrating components of the display system in one embodiment.

FIG. 3 is a block diagram illustrating components of the display system in one embodiment. The display system 300 is connected to web server 310 via communications link 320. The display system may execute on a device with a small display area, such as a PDA. The display system includes a user interface component 301, a display node component 302, an update node component 303, an identify segments component 304, a cache fragment component 305, and a split segment component 306. The display system also includes cache 307 for storing the cached information. The user interface component may input user commands and invoke the display node component to display a node selected by the user. The display system may provide a hierarchical browse capability that allows a user to browse through the node hierarchy of a web page. For example, when a display page is first accessed, the root node is selected. The user interface component invokes the display node component to display the selected node. If the root node contains child nodes, then the display node component would display a list of the child nodes. A user can select a child node to browse the hierarchy of nodes. The user interface component invokes the display node component passing the selected node. When a leaf node is passed, the display node component displays the content of the leaf node. Before displaying a node, the display node component updates the content of a selected node by invoking the update node component. The update node component refreshes the cache for that node as appropriate. When new content is retrieved for a node, the update node component identifies segment nodes by invoking the identify segments component, and caches the content within the node by invoking the cache fragment component. The cache fragment component may invoke the split segment component to subdivide a segment node into block nodes. The display node component retrieves node content from the cache and then displays it on a display device 308. The web server includes a web engine 311 that generates dynamic web pages and portions of dynamic web pages upon receiving a request from the display system.

The computing device on which the display system is implemented may include a central processing unit, memory, input devices (e.g., keyboard and pointing devices), output devices (e.g., display devices), and storage devices (e.g., disk drives). The memory and storage devices are computer-readable media that may contain instructions that implement the display system. In addition, the data structures and message structures may be stored or transmitted via a data transmission medium, such as a signal on a communications link. Various communications links may be used, such as the Internet, a local area network, a wide area network, or a point-to-point dial-up connection.

The display system may be implemented in various operating environments that include personal computers, PDAs, cell phones, server computers, hand-held or laptop devices, multiprocessor systems, microprocessor-based systems, programmable consumer electronics, network PCs, minicomputers, mainframe computers, distributed computing environments that include any of the above systems or devices, and the like.

The display system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
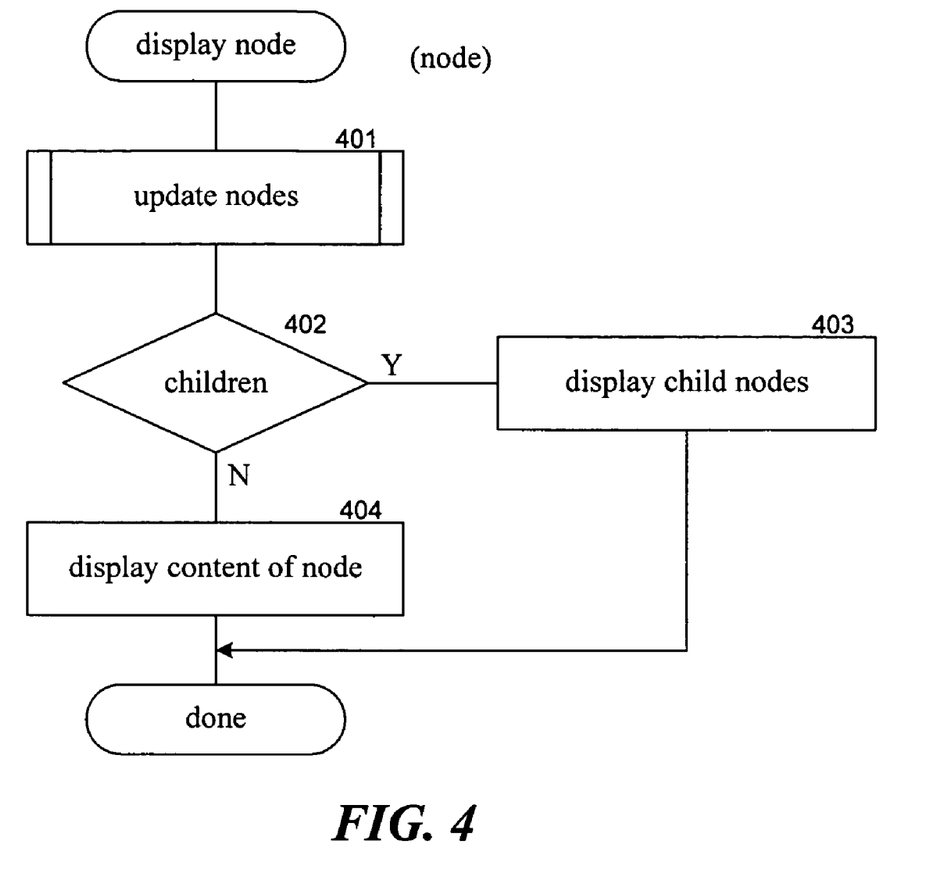
FIG. 4 is a flow diagram that illustrates the processing of the display node component in one embodiment.

FIG. 4 is a flow diagram that illustrates the processing of the display node component in one embodiment. The component is passed a node and controls the displaying of that node on the display device. In block 401, the component invokes the update node component to update the cache for the passed node as appropriate. In decision block 402, if the passed node has child nodes, then the component continues at block 403, else the passed node is a block node and the component continues at block 404. In block 403, the component displays the child nodes and then completes. For example, when fragment node f0 is selected by user, the component displays a list of the child nodes that includes fragment nodes f1 and f2 and non-fragment node c1. In block 404, the component displays the content of the passed node and then completes. A node that has no child nodes is a block node. For example, if block node b1 is passed, then its content is retrieved from the cache and displayed. If fragment node f3 is passed, then its content is retrieved from the cache and displayed.

Figure 5:
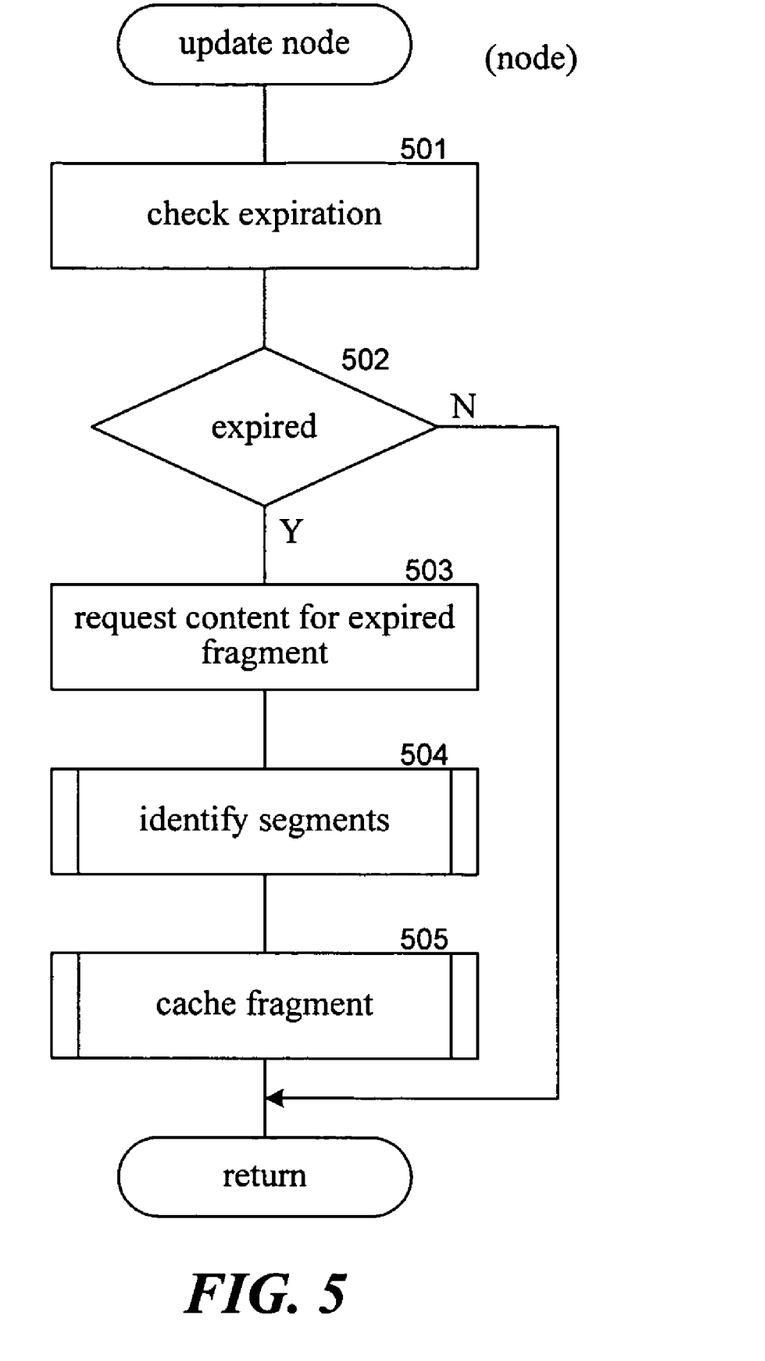
FIG. 5 is a flow diagram that illustrates the processing of the update node component in one embodiment.

FIG. 5 is a flow diagram that illustrates the processing of the update node component in one embodiment. The component is passed a node and refreshes the cache as appropriate. In block 501, the component checks whether the passed node has expired. In decision block 502, if the passed node has expired, then the component continues at block 503, else the component returns. In block 503, the component requests the content for the passed fragment node from the display page server. In block 504, when the content is retrieved, the component invokes the identify segments component to identify the segment nodes within the retrieved fragment node. In block 505, the component invokes the cache fragment component to cache the content of the retrieved fragment node along with the adaptation information. The component then returns.

Figure 6:
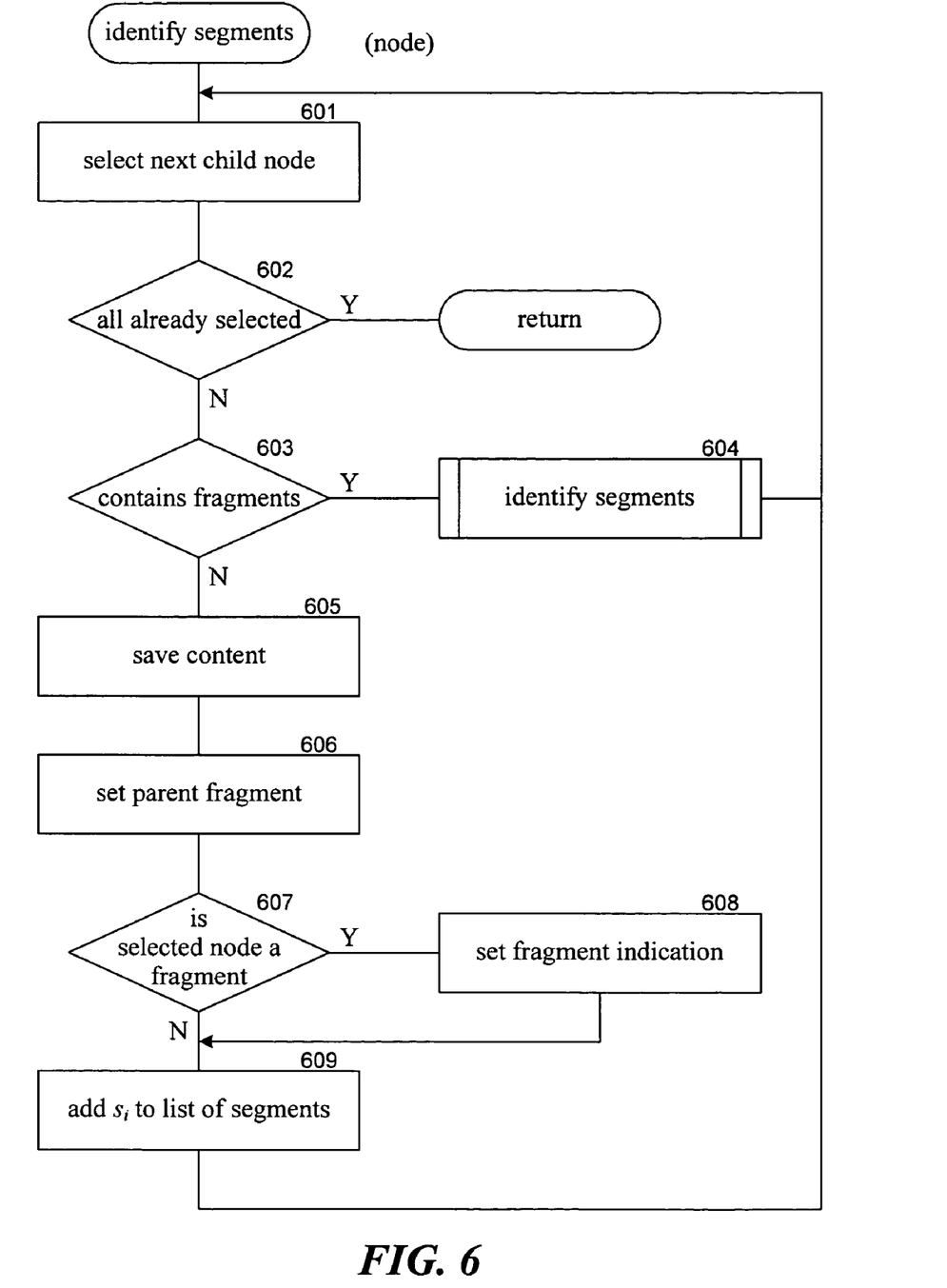
FIG. 6 is a flow diagram that illustrates the processing of the identify segments component in one embodiment.

FIG. 6 is a flow diagram that illustrates the processing of the identify segments component in one embodiment. The component is passed a document node and identifies segment nodes within that document node. In blocks 601-609, the component loops selecting each child node of the passed node and identifying whether it is a segment node and, if not, recursively invoking the identify segments component to identify segments within the selected child node. If the passed document node has no child nodes, then it is designated a segment node and the component returns immediately (not shown in FIG. 6). In block 601, the component selects the next child node of the passed node. In decision block 602, if all the child nodes have already been selected, then the component returns, else the component continues at block 603. In decision block 603, if the selected child node contains fragment nodes, then the component continues at block 604, else the child node is a segment node and the component continues at block 605. In block 604, the component recursively invokes the identify segments component to identify segment nodes within the selected child node. The component then loops to block 601 to select the next child node. In block 605, the selected child node is a segment node, and the component saves the content of the segment node. In block 606, the component sets an indicator of the parent fragment node of the selected child node. The root document node has no parent fragment node. In decision block 607, if the selected child node is a fragment node, then the component continues at block 608 to set a fragment indicator and then continues at block 609, else the component continues at block 609. In block 609, the component adds the selected child node to the list of segment nodes and then loops to block 601 to select the next child node.

Figure 7:
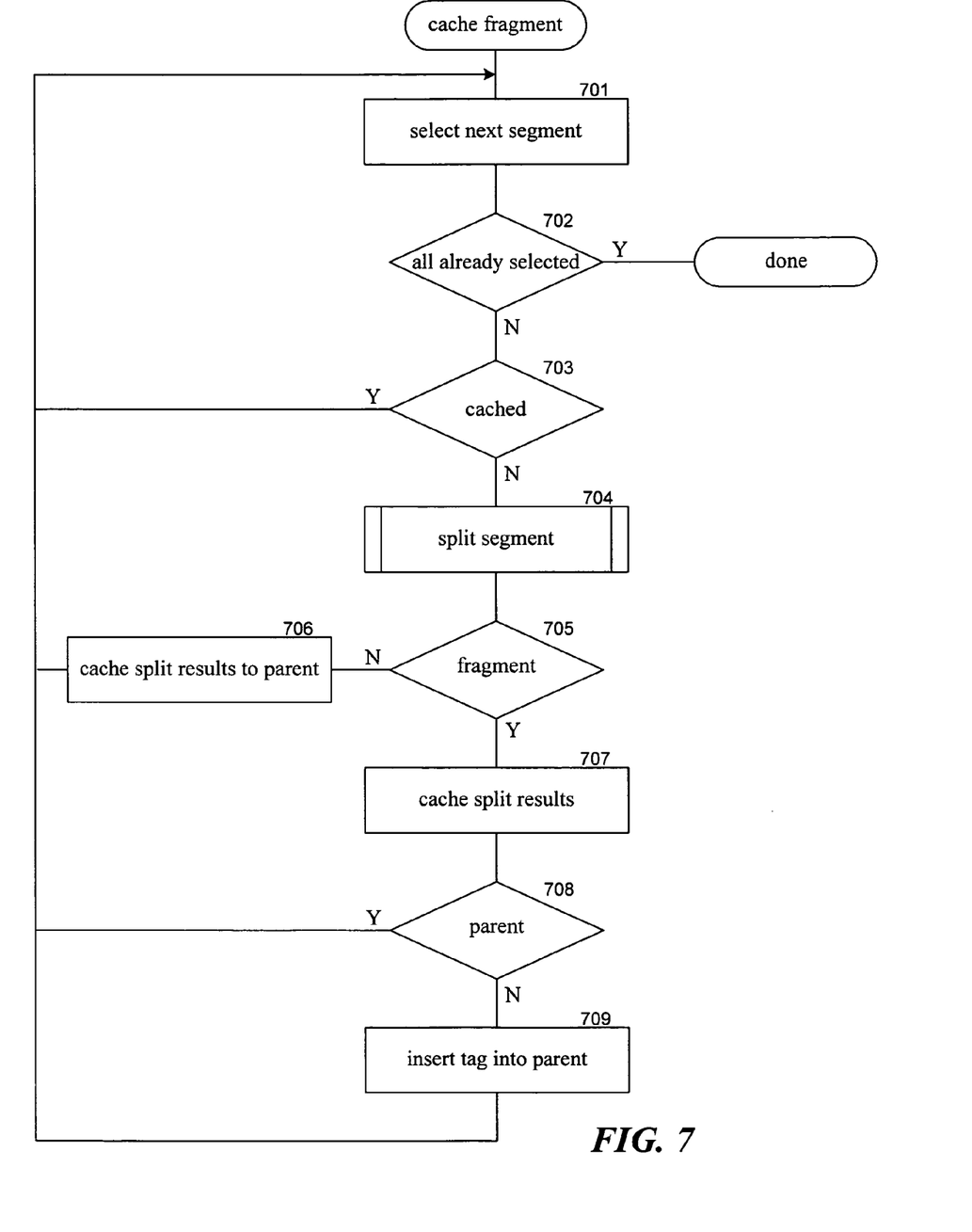
FIG. 7 is a flow diagram that illustrates the processing of the cache fragment component in one embodiment.

FIG. 7 is a flow diagram that illustrates the processing of the cache fragment component in one embodiment. The component loops caching the content of the identified segment nodes that are fragment nodes. In block 701, the component selects the next segment node. In decision block 702, if all the segment nodes have already been selected, then the component returns, else the component continues at block 703. In decision block 703, if the selected segment node is already cached, then the component loops to block 701 to select the next segment node, else the component continues at block 704. In block 704, the component invokes the split segment component to designate the selected segment as a block or to subdivide it into blocks. In decision block 705, if the selected segment node is a fragment node, then the component continues at block 707, else the component continues at block 706. In block 706, the component caches the split results with the nearest ancestor fragment node and then loops to block 701 to select the next segment node. The component caches the split result in one embodiment by inserting special tags into the display page document to delimit the blocks. In block 707, the component caches the split results with the selected segment node. In decision block 708, if the parent fragment node is null (indicating a root node), then the component loops to block 701 to select the next segment node, else the component continues at block 709. In block 709, the component inserts tags into the parent fragment node to indicate the split result. The component then loops to block 701 to select the next segment node.

Figure 8:
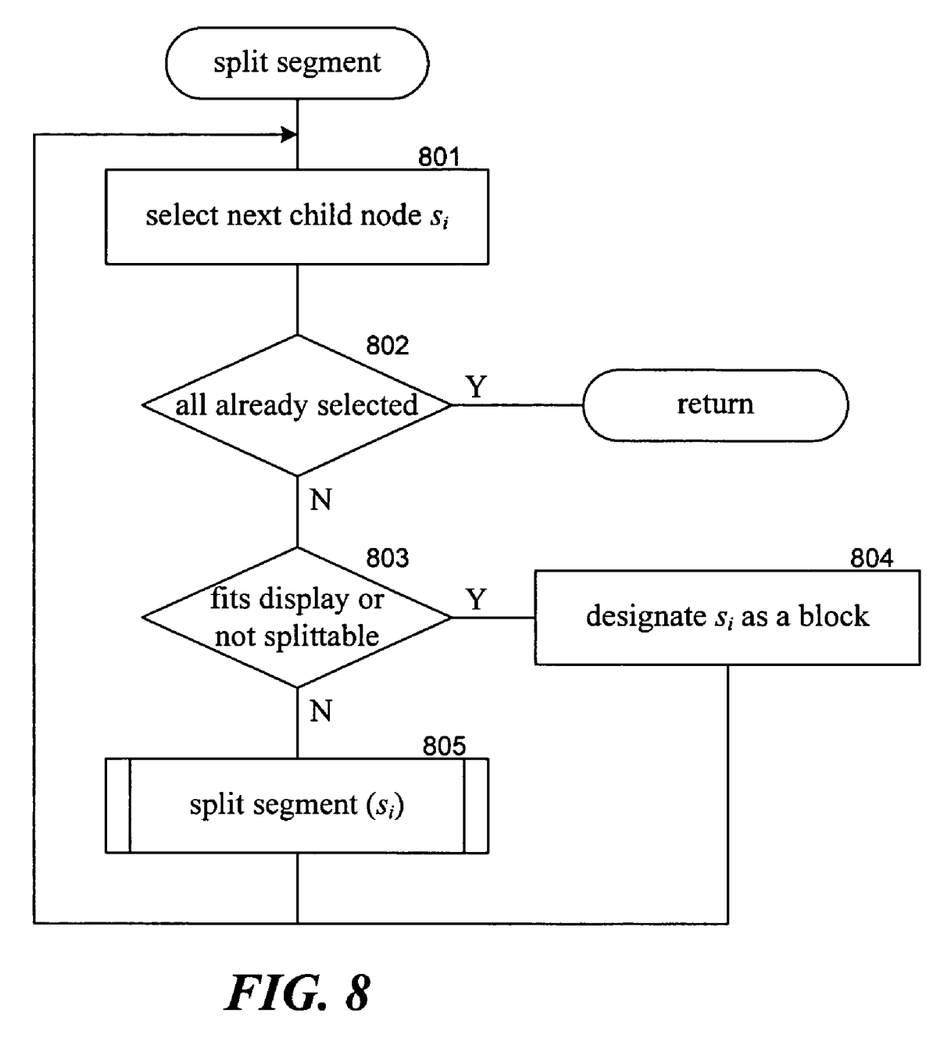
FIG. 8 is a flow diagram that illustrates the processing of the split segment component in one embodiment.

FIG. 8 is a flow diagram that illustrates the processing of the split segment component in one embodiment. The component is passed a segment node. If the passed segment has no child nodes, then the component designates it as a block node that cannot be subdivided, else the component subdivides the segment node into block nodes. In block 801, the component selects a next child node of the passed node. If the passed node has no child nodes, then the component designates it as a block node and returns (not shown in FIG. 8). In decision block 802, if all the child nodes have already been selected, then the component returns, else the component continues at block 803. In block 803, if the selected child node fits onto a display device or cannot be subdivided, then the component continues at block 804, else the component continues at block 805. In block 804, the component designates the selected child node as a block node and then loops to block 801 to select the next child node. In block 805, the component recursively invokes the split segment component passing the selected child node and then loops to block 801 to select the next child node.

One skilled in the art will appreciate that although specific embodiments of the display system have been described herein for purposes of illustration, various modifications may be made without deviating from the spirit and scope of the invention. Accordingly, the invention is not limited except by the appended claims.

We claim:

1. A method for displaying contents of a display page on a display device, the method comprising:

retrieving content of the display page from a display page server, the content being organized hierarchically into document nodes, some document nodes being designated as fragment nodes that can be cached, each fragment node having an expiration;

identifying as segment nodes those document nodes that have no child document nodes;

designating as block nodes segment nodes and subdivisions of segment nodes that are to be displayed individually on the display device;

caching content of fragment nodes, the identification of segment nodes, and the designation of block nodes; and upon receiving a request to display content of a node,
when the cached content of the node has expired,
retrieving from a display page server content of an expired fragment node that has expired and that is an ancestor of the node without retrieving other fragment nodes;
identifying as segment nodes those document nodes of the expired fragment node that have no child document node without re-identifying as segment nodes for document nodes other than the expired fragment node;
designating as block nodes segments nodes and subdivisions of segment nodes of the expired fragment node that are to be displayed individually on the display device without re-designating as block nodes the segment nodes of document nodes other than the expired fragment node; and caching the retrieved content of the expired fragment node, the identification of segment nodes of the expired fragment, and the designation of block nodes of the expired fragment node; and displaying the content of the node based on the cached content, the identification of segment nodes, and the designation of block nodes so that segment nodes are identified and block nodes are designated for only an expired node whose content is to be displayed to avoid having to re-identify segment nodes and re-designate block nodes for all the document nodes of the display page.

2. The method of claim 1 wherein the received request to display content of a node specifies a document node.

3. The method of claim 1 wherein the received request to display content of a node specifies a block node.

4. The method of claim 1 wherein a fragment node contains descendent fragment nodes.

5. The method of claim 1 wherein the cached content of a node expires when the cached content of an ancestor fragment node has expired.

6. The method of claim 5 wherein a node is an ancestor of itself.

7. The method of claim 1 wherein the designating as block nodes designates a segment node as a block node when not subdivided.

8. The method of claim 1 wherein the designating as block nodes designates a segment node as a block node when it fits on the display device.

9. The method of claim 1 wherein a segment node is subdivided into a hierarchy of block nodes.

10. A computer-readable medium containing instructions for controlling a computer system to display content of a display page on a display device, by a method comprising:

retrieving content of the display page from a display page server, the content being organized hierarchically into document nodes, some document nodes being designated as fragment nodes that can be cached the fragment nodes having expirations;

designating as block nodes subdivisions of leaf document nodes that are to be displayed individually on the display device;

caching content of fragment nodes and designations as block nodes; and upon receiving a request to display content of a node, when the cached content of the node has expired, retrieving from the display page server content of an expired fragment node that has expired and that is an ancestor of the node without retrieving other fragment nodes, designating as block nodes subdivisions of leaf document nodes of the expired fragment node that are to be displayed individually on the display device without re-designating as block nodes subdivisions of leaf document nodes of document nodes other than the expired fragment node, and caching the retrieved content and the designation of block nodes;and displaying the content of the node based on the cached content and designation of block nodes.

11. The computer-readable medium of claim 10 wherein the received request to display content of a node specifies a document node.

12. The computer-readable medium of claim 10 wherein the received request to display content of a node specifies a block node.

13. The computer-readable medium of claim 10 wherein a fragment node contains a descendent fragment node.

14. The computer-readable medium of claim 10 wherein the cached content of a node expires when the cached content of an ancestor fragment node has expired.

15. The computer-readable medium of claim 14 wherein a node is an ancestor of itself.

16. The computer-readable medium of claim 10 wherein the designating as block nodes designates a leaf node as a block node when not subdivided.

17. The computer-readable medium of claim 10 wherein the designating as block nodes designates a leaf node as a block node when it fits on the display device.

18. The computer-readable medium of claim 10 wherein a leaf node is subdivided into a hierarchy of block nodes.

19. A computer-readable medium containing instructions for controlling a computer system to display contents of a display page on a display device, the display page being hierarchically organized into document nodes, some document nodes being cacheable with expirations, by a method comprising:

designating as block nodes subdivisions of leaf document nodes that are to be displayed individually on the display device;

caching contents of cacheable document nodes and designations as block nodes; and upon receiving a request to display content of a node, when the content of the node has expired, retrieving from a display page server content of an expired ancestor cacheable document node that has expired without retrieving other cacheable document nodes, designating as block nodes subdivisions of leaf document nodes of the expired ancestor cacheable document node that are to be displayed individually on the display device without re-designating as block nodes subdivisions of leaf document nodes of document nodes other than the expired ancestor cacheable document node, and caching the retrieved content and the designation of block nodes; and displaying the content of the node based on the cached content and the designation of block nodes.

20. The computer-readable medium of claim 19 wherein the received request to display content of a node specifies a document node.

21. The computer-readable medium of claim 19 wherein the received request to display content of a node specifies a block node.

22. The computer-readable medium of claim 19 wherein a cacheable document node contains a descendent cacheable document node.

23. The computer-readable medium of claim 19 wherein the cached content of a node expires when the cached content of an ancestor cacheable document node has expired.

24. The computer-readable medium of claim 23 wherein a node is an ancestor of itself.

25. The computer-readable medium of claim 19 wherein the designating as block nodes designates a leaf document node as a block node when not subdivided.

26. The computer-readable medium of claim 19 wherein the designating as block nodes designates a leaf document node as a block node when it fits on the display device.

27. The computer-readable medium of claim 19 wherein a leaf document node is subdivided into a hierarchy of block nodes.

28. A computer-readable medium containing instructions for controlling a computer system to display content of a display page on a display device, by a method comprising:

retrieving content of the display page from a display page server, the content being organized hierarchically into document nodes, some document nodes being designated as fragment nodes that can be cached, the fragment nodes having expirations;

generating adaptation information for the display page that identifies subdivisions of leaf document nodes that are to be displayed individually on the display device;

caching content of fragment nodes and the adaptation information; and upon receiving a request to display content of a specific node,
   when the cached content of the specific node has expired,
      retrieving from the display page server content of a fragment node that has expired and that is an ancestor of the node without retrieving other fragment nodes, re-generating adaptation information for the retrieved fragment node without re-generating adaptation information for the other fragment nodes and caching the retrieved content and the re-generated fragmentation information; and
   displaying the content of the specific node based on the cached content and re-generated adaptation information.

\* \* \* \* \*